(12) United States Patent
Schindler et al.

(10) Patent No.: US 7,174,948 B2
(45) Date of Patent: Feb. 13, 2007

(54) HEAT EXCHANGER

(75) Inventors: Martin Schindler, Stuttgart (DE);
Michael Schmidt, Bietigheim-Bissingen (DE)

(73) Assignee: BEHR GmbH & Co., Stuttgart (DE)

( * ) Notice: Subject to any disclaimer, the term of this patent is extended or adjusted under 35 U.S.C. 154(b) by 101 days.

(21) Appl. No.: 10/493,467

(22) PCT Filed: Aug. 24, 2002

(86) PCT No.: PCT/EP02/09487

§ 371 (c)(1),
(2), (4) Date: Jun. 22, 2004

(87) PCT Pub. No.: WO03/036214

PCT Pub. Date: May 1, 2003

(65) Prior Publication Data
US 2005/0034843 A1 Feb. 17, 2005

(30) Foreign Application Priority Data
Oct. 24, 2001 (DE) ................................ 101 52 595

(51) Int. Cl.
*F01N 5/02* (2006.01)
(52) U.S. Cl. ........................................... 165/81; 165/51
(58) Field of Classification Search .................. 165/81, 165/51, 82
See application file for complete search history.

(56) References Cited

U.S. PATENT DOCUMENTS

| | | | | |
|---|---|---|---|---|
| 1,593,537 A | * | 7/1926 | Mantle | ......................... 165/81 |
| 1,776,292 A | * | 9/1930 | Meyers | ......................... 165/81 |
| 2,232,936 A | * | 2/1941 | Bimpson | ..................... 165/81 |
| 2,336,879 A | * | 12/1943 | Mekler | ......................... 165/81 |
| 4,974,569 A | | 12/1990 | Ampferer et al. | |
| 5,022,581 A | | 6/1991 | Zimmer | |
| 5,584,340 A | | 12/1996 | Derosier | |
| 6,129,142 A | | 10/2000 | Beldam | |
| 6,260,612 B1 | * | 7/2001 | Nakamura et al. | ............ 165/81 |
| 6,269,870 B1 | | 8/2001 | Banzhaf et al. | |

FOREIGN PATENT DOCUMENTS

| | | |
|---|---|---|
| DE | 34 35 093 A1 | 4/1986 |
| DE | 296 12 361 U1 | 10/1996 |
| DE | 199 07 163 A1 | 10/1999 |
| DE | 100 09 179 A1 | 9/2001 |
| EP | 0 422 370 B1 | 4/1991 |
| FR | 2 625 301 A3 | 6/1989 |
| GB | 2 164 738 A | 3/1986 |

* cited by examiner

*Primary Examiner*—Leonard R. Leo
(74) *Attorney, Agent, or Firm*—Foley & Lardner LLP

(57) ABSTRACT

The invention relates to an exhaust-gas thermal conductor (1), comprising a tube array with exhaust gas flowing therethrough and cooling medium flowing around the same. The tube array is welded to a tube base (5), connected to the housing (2). As a result of varying temperature effects on the tubes and on the housing (2) whilst operating the exhaust gas thermal conductor (1), thermal stresses, as a result of differing expansion of the tubes and the housing (2), occur. According to the invention, said stresses may be avoided, whereby slots (8-10) are arranged in the housing sleeve (2), which are externally sealed by means of a bellows.

23 Claims, 5 Drawing Sheets

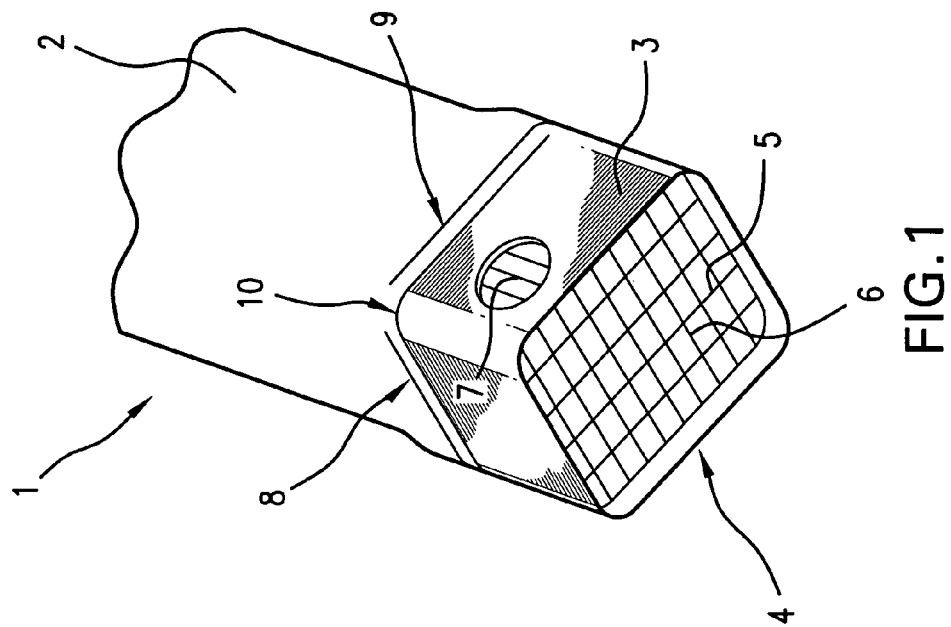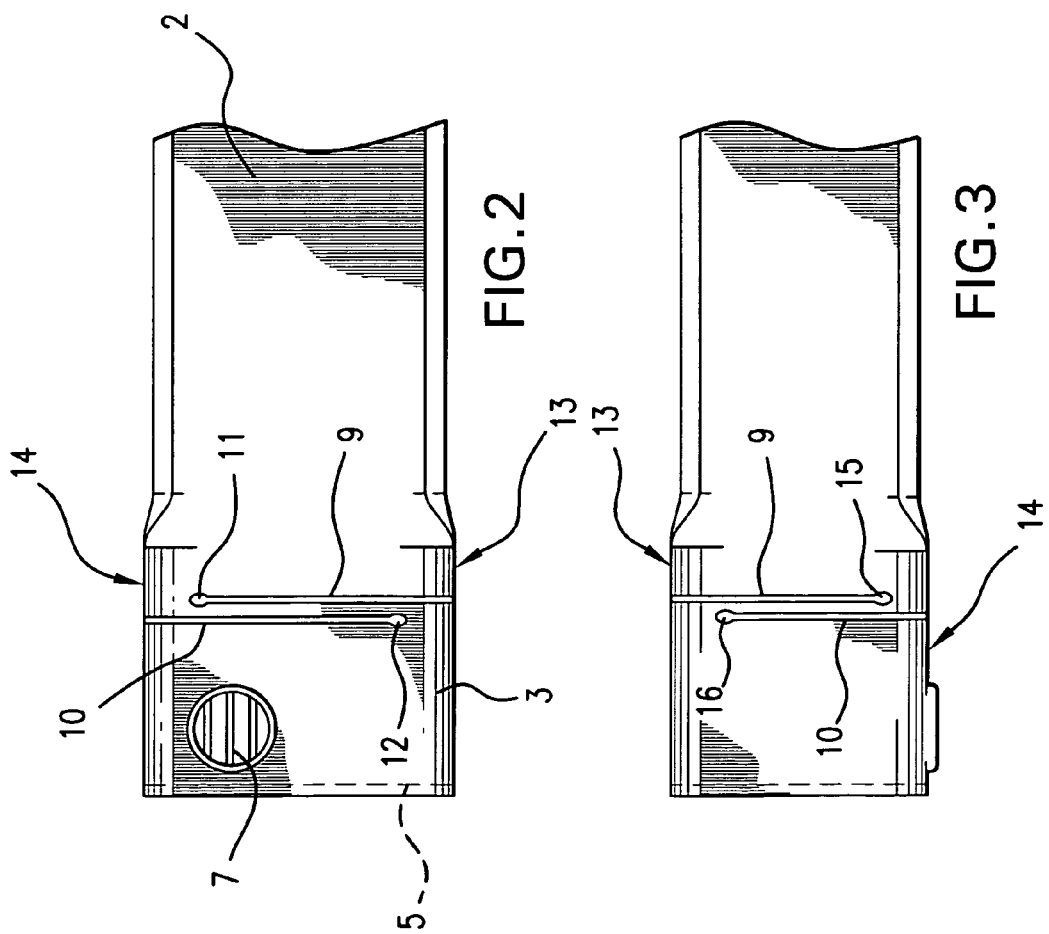

HEAT EXCHANGER

BACKGROUND OF THE INVENTION

The invention relates to a heat exchanger, in particular an exhaust gas heat exchanger, heat exchanger, having a fluid channel, such as a tube or multiplicity of tubes, like a tube array, through which a first medium, such as exhaust gas, can flow, and a second fluid channel, such as a housing, through which a second medium, such as a coolant, can flow, the ends of the tube array being connected to the tube plates, for example in a cohesive manner, and the tube plates being connected to the housing, for example in a cohesive manner.

Such a heat exchanger as an exhaust gas heat exchanger has been disclosed by DE-A 199 07 163 from the applicant. In this known design, the ends of a tube array are accommodated in appropriate openings in a tube plate and are welded to the tube plate. The tube array with the two tube plates is arranged in the housing, the tube plates being welded circumferentially to the shell of the housing. Thus, the tubes are firmly connected to the housing via the tube plate, which can lead to thermal stresses under certain conditions. Hot exhaust gas flows through the tubes on the inside and colder coolant flows on the outside and also washes around the inside of the housing. In particular in the case of relatively long tube lengths of such an exhaust gas heat exchanger, for example for commercial vehicles, the different expansions of tubes and housing shell can lead to stresses which are no longer permissible, which can result, for example, in destruction of the tube-plate connection.

It is therefore an object of the invention to improve an exhaust gas heat exchanger of the type mentioned at the beginning to the effect that thermal stresses on account of different expansions are reduced or avoided, so that the heat exchanger achieves the service life which is normal in motor vehicles.

SUMMARY OF THE INVENTION

In a heat exchanger, such as in particular an exhaust gas heat exchanger, having a fluid channel, such as a tube array, through which a first medium, such as exhaust gas, can flow, and a second fluid channel, such as a housing, through which a second medium, such as a coolant, can flow, the ends of the tube array being connected to the tube plates, for example in a cohesive manner, and the tube plates being connected to the housing, for example in a cohesive manner, the object is preferably achieved by the housing having an expansion element.

It is expedient in this case if a sealing element, such as a metal bellows, is arranged on the housing, covering and sealing the expansion element.

It can also be advantageous if the expansion element is formed in one piece with a sealing element.

Furthermore, it is expedient if the expansion element is formed as a circumferential bead.

It is particularly advantageous, moreover, if a sealing element, such as a metal bellows or another sealing element, for example made of plastic or an elastomer, is arranged on the housing, covering and sealing the expansion element.

The expansion element can also be formed in one piece with the sealing element, for example as a circumferential bead, which performs the sealing function and the expansion function at the same time.

It is advantageous in this case if the expansion element is at least one region of the housing that is provided with slots. It is expedient in this case if, as an expansion element, the housing or a region of the housing has slots which run transversely with respect to the longitudinal direction of the tubes and in the circumferential direction of the housing, which in each case extend only over part of the circumference and which in the circumferential direction partly overlap slots arranged offset axially.

In this case, in one exemplary embodiment, it can be expedient if at least one group of slots having at least two slots is provided in the housing. It is advantageous if the at least one group of slots is arranged in a central region of the housing, as viewed in the longitudinal direction of the heat exchanger. It is also advantageous if the at least one group of slots is arranged in an end region or close to an end region of the housing, as viewed in the longitudinal direction of the heat exchanger.

In a further exemplary embodiment, it is advantageous if two groups of slots are provided. In this case, it can be advantageous if the two groups of slots are arranged in the two end regions or close to the end regions of the housing. Likewise, it can be expedient if the groups of slots has at least two or a multiplicity of slots, such as three, four, five, six, etc. slots.

According to a further idea of the invention, it can be expedient if four slots are arranged in the housing or in a group of slots, in each case two extending over less than half the circumference in one of two transverse planes and slotted regions of the other transverse plane being located opposite the non-slotted regions of a transverse plane.

According to the invention, in a further exemplary embodiment it is expedient if, given an arrangement of two slots per group of slots, the slots are spaced apart and are formed in such a way that they run beside one another in a subregion of their extent and leave a narrow land between themselves.

In a further embodiment of the invention, it is expedient if, given an arrangement of three slots per group of slots, the slots are spaced apart and are formed in such a way that they run beside one another in a subregion of their extent and leave two narrow lands between themselves.

It can also be expedient if, given a group of slots, at least two lands or a multiplicity of lands, such as three, four, etc., are formed, as viewed over the circumference of the housing. It is likewise advantageous if, given a group of slots with an arrangement of two lands per group, the lands lie opposite one another, as viewed in the radial direction of the housing.

Moreover, it is expedient if, given a group of slots with an arrangement of two or more lands per group, the lands are distributed uniformly, as viewed in the circumferential direction of the housing.

It is advantageous if four lands are formed by four slots which partly intersect at four points of the housing, that is to say that in each case two slots partly intersect in a region and thus form the land.

It is expedient if four times two parallel lands are formed by six slots which partly intersect at four points of the housing.

It is also expedient if the slots have a teardrop shape in their end regions.

Moreover, it is expedient if the slots are introduced into the housing by means of one of the following processes: laser cutting, water jet cutting, sawing, milling, erosion or punching.

It is also advantageous if the expansion element and/or the sealing element is formed from one of the following materials: metal, steel, elastomer, silicone.

Likewise, it is expedient if the expansion element and/or the sealing element is connected to a housing part or two housing parts or is formed in one piece with the latter.

According to the invention, it is expedient if the expansion element and/or the sealing element is connected to the housing by welding, soldering, by means of clamping elements or by means of adhesive bonding.

If, in the case of such an exhaust gas heat exchanger, differential expansion occurs between the exhaust gas tubes and the housing shell, then, on account of the slots running transversely with respect to the longitudinal direction of the tubes, the housing is capable of expanding in the same way as the tubes. This takes place as a result of elastic deformation of the housing shell in the region of the slots, more precisely between two axially offset slots. In order that the coolant which washes around the tubes does not emerge into the open from the slots in the housing, a metal bellows is arranged on the housing over the region of the slots, ensuring the necessary sealing and at the same time being able to follow the expansions of the housing. On account of these measures, thermal stresses and component damage or destruction caused by them are avoided, even in the case of long heat exchanger lengths.

BRIEF DESCRIPTION OF THE DRAWINGS

An exemplary embodiment of the invention is illustrated in the drawing and will be described in more detail in the following text. In the drawing:

FIG. 1 shows a perspective view of part of an exhaust gas heat exchanger,

FIG. 2 shows a plan view of part of an exhaust gas heat exchanger,

FIG. 3 shows a side view of the part of the exhaust gas heat exchanger according to FIG. 2

DETAILED DESCRIPTION OF THE INVENTION

Figure 4:
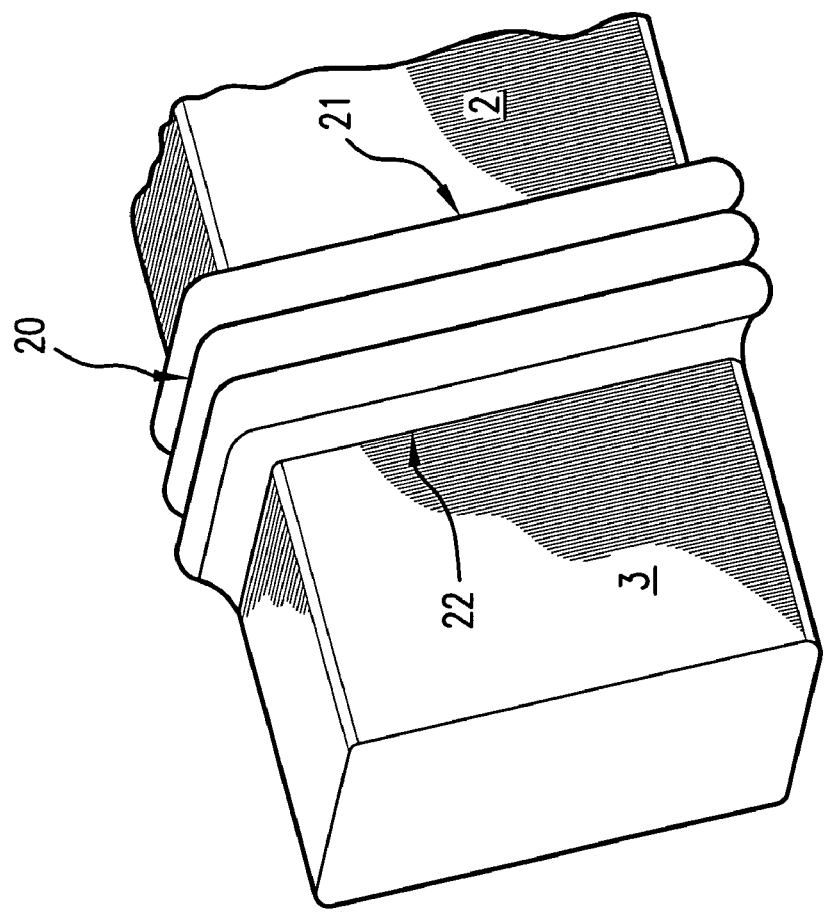
FIG. 4 shows a view of part of the exhaust gas heat exchanger with metal bellows.

FIG. 1 shows a perspective view of part of a heat exchanger, such as in particular an exhaust gas heat exchanger 1, having a housing shell 2 which is approximately rectangular in cross section and which, in its end region 3, is somewhat enlarged in cross section. However, the cross section can also have another geometry, such as round, polygonal, octagonal etc. The end 4 reveals the tube plate 5 with rectangular openings to accommodate fluid channels, such as exhaust gas tubes, which are not illustrated. The ends of these exhaust gas tubes are—as described, for example, in DE-A 199 07 163 already mentioned—welded to the tube plate which, in turn, is welded circumferentially to the housing shell 3. Provided in the housing region 3 is an opening 7 for the inlet of coolant, which is distributed in the interior of the housing region 3 in an annular channel, not illustrated, and from there flows through the heat exchanger on the outer side of the exhaust gas tubes. Finally, approximately in the transition region of the housing regions 2 and 3, three slots 8, 9 and 10 running in the circumferential direction of the housing can be seen, the slot 10 being offset axially with respect to the two slots 8 and 9 and likewise being offset in the circumferential direction.

FIG. 2 shows these slots 9 and 10 in a plan view of the housing ⅔ of the heat exchanger 1. The slots 9 and 10 extend in the direction of the circumference of the housing as far as a circular or teardrop-shaped opening 11 or 12, respectively, which is intended to avoid notch stresses in this region. The slot 9 reaches as far as the outer edge 13, and the slot 10 as far as the outer edge 14.

As can be seen in FIG. 3, the slot 9 runs onward in the circumferential direction from the edge 13 as far as the circular hole 15, and the slot 10 runs onward from the edge 14 as far as the circular hole 16. Both slots 9 and 10 are offset axially approximately by a region of a few mm, for example 5 mm. The tube plate is indicated at the front end of the housing 3 by a dashed line 5. The entire exhaust gas heat exchanger 1 is illustrated incompletely in FIGS. 1, 2 and 3, inasmuch as a seal for the slots 9 and 10 with respect to the outside is missing—this seal, in the form of a metal bellows, will be described in FIG. 4.

FIG. 4 shows a view of part of the heat exchanger with the two housing regions 2 and 3, a metal bellows 20 being arranged between these two regions—said bellows covers the slots, which cannot be seen in this depiction, as have been described in the previous FIGS. 1 to 3. The metal bellows is matched to the cross section of the housing ⅔ and tightly connected to the latter via its circumferential edges 21 and 22. As a result, coolant can no longer emerge to the outside from the interior of the housing via the slots—at the same time this metal bellows 20 is able to compensate for the expansions of the two housing regions 2 and 3.

Figure 5:
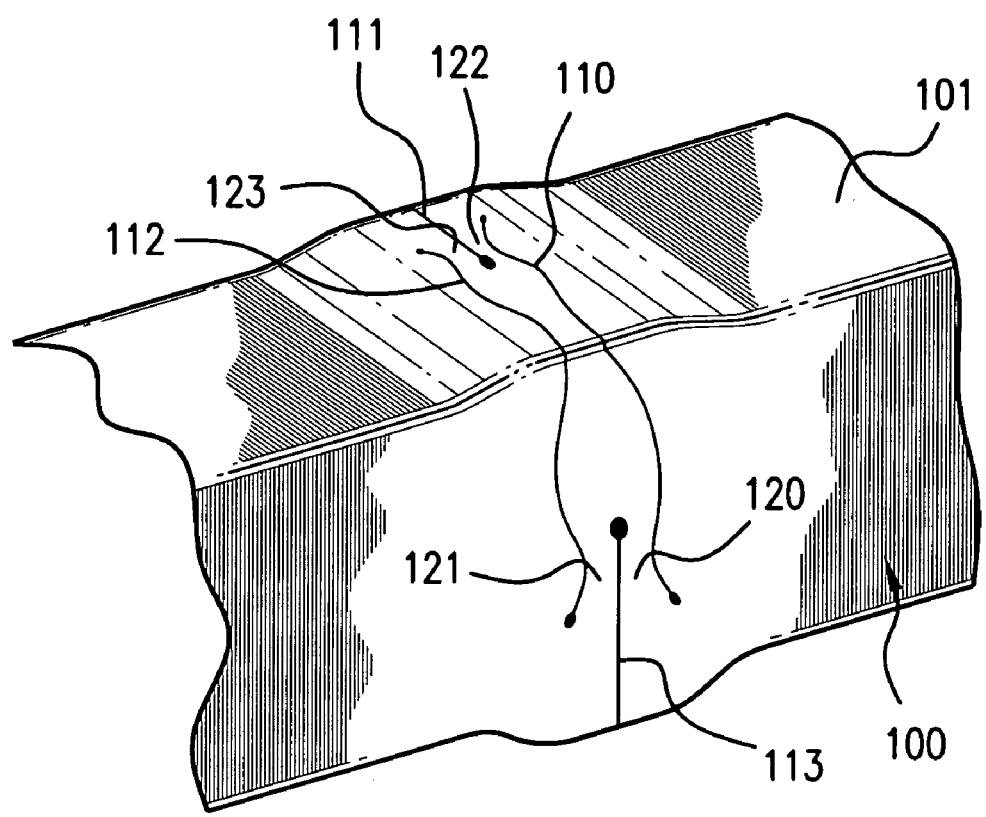
FIG. 5 shows an extract of a heat exchanger.

FIG. 5 shows a part of a heat exchanger 100 in which four slots 110 to 113 are introduced into the wall 101 of the housing, the slots being offset axially and in the circumferential direction in such a way that lands, which act as expanding or bending beams, remain between the slots.

As a result, one part of the heat exchanger can expand in such a way that the housing shell of the heat exchanger is flexible as a result of the bending beam or beams and ensures expansion of the housing.

As shown in FIG. 5, two bending beams are formed by the lands 120 to 123 for each face of the housing, this being the case on all four faces, that is to say even on the faces which cannot be seen in this view.

Figure 6A:
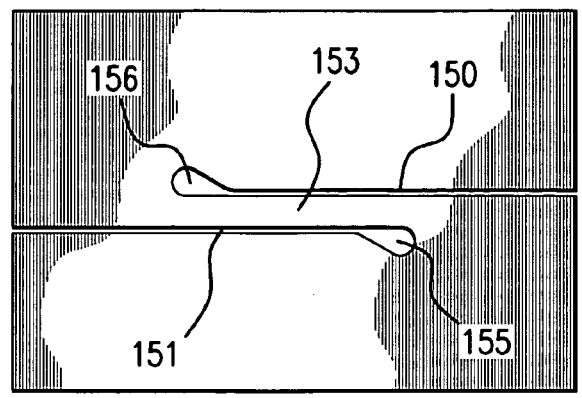
FIGS. 6a to 6c show a view of arrangements of slots and lands.
Figure 6B:
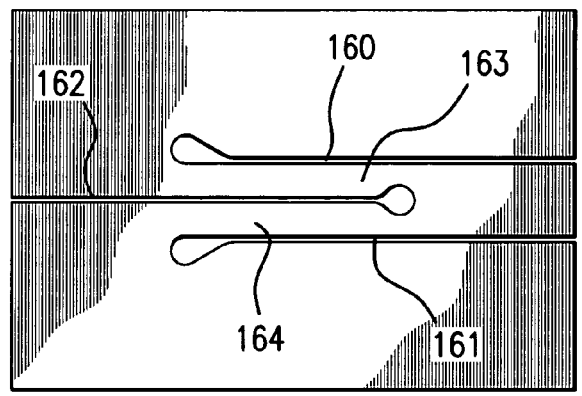
Figure 6C:
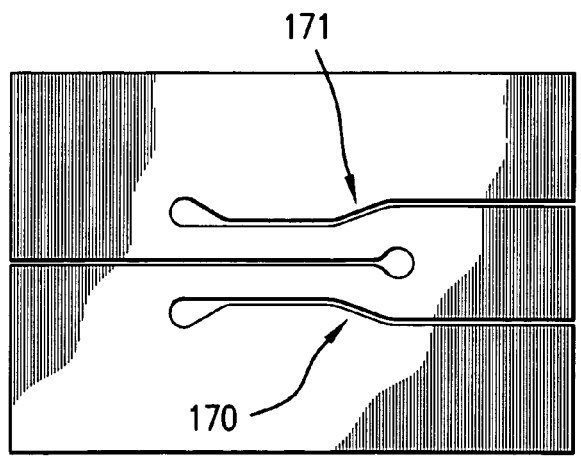

FIGS. 6a to 6c show variants of designs of slots and lands which are machined into the housing shell in order to form the bending beams.

In FIG. 6a, two slots 150, 151 are formed or introduced into the housing. Between the slots there is a land 153, which serves as a bending beam. Provided at the ends of the slots are teardrop-shaped cutouts 155, 156. In FIG. 6b, three slots 160, 161, 162 are formed or introduced into the housing. Provided between these slots are two lands 163 and 164, which serve as bending beams. Teardrop-shaped cutouts are provided at the ends of the slots.

The configuration of the slots of FIG. 6c corresponds substantially to the configuration of FIG. 6b, the slots being angled over in a region 170, 171. These regions can also be curved.

Figure 7:
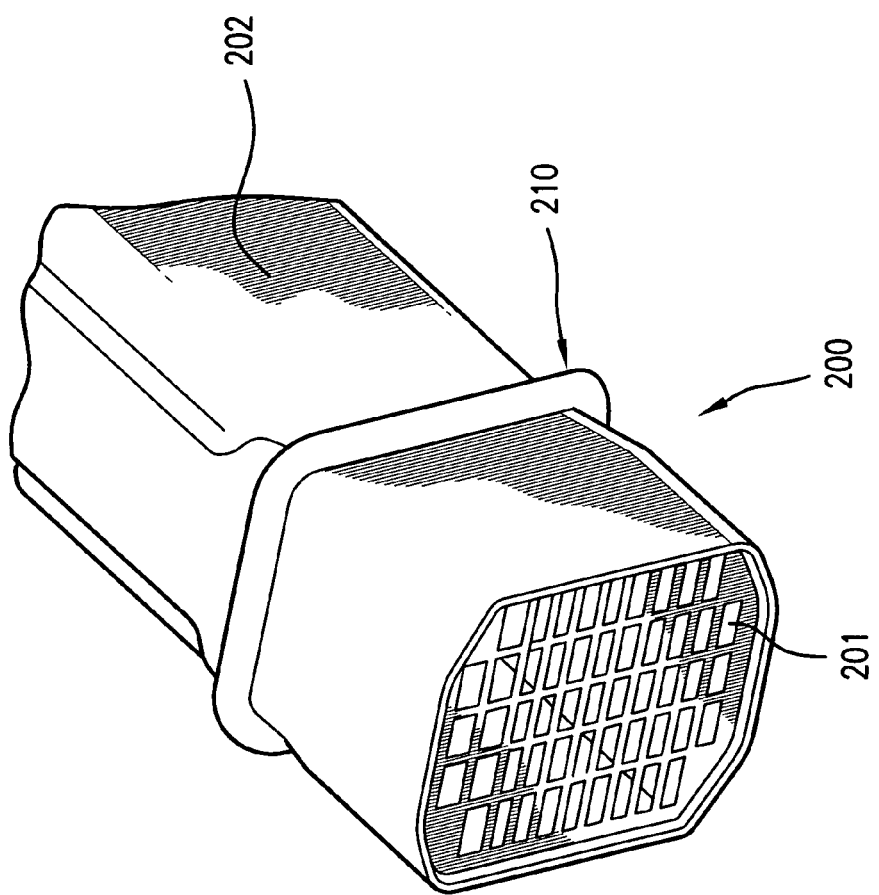
FIG. 7 shows a partial view of a heat exchanger.

FIG. 7 shows a partial view of a heat exchanger 200 with fluid channels through which a first medium can flow. In the exemplary embodiment of an exhaust gas heat exchanger, these are the fluid channels through which the exhaust gas flows.

A second medium can flow between the fluid channels 201 and possibly around the latter as a further fluid channel, in order to cool the medium in the first fluid channel. This second fluid channel is therefore located within the housing 202.

For the purpose of improved mechanical decoupling on account of the different thermal expansion of the walls of the channels 201 and the housing 202, a circumferential bead 210 is introduced into the housing at at least one point. As a result, the housing, which is generally at a lower temperature than the inner channels during the operation of the heat exchanger, is able to expand when the inner channels expand on account of the thermal expansion, without destruction of the heat exchanger occurring.

The bead 210 is in this case constituted, for example, by a semicircular bulge. However, it can also have another form, such as in a folded or meandering configuration. The bead can also be bulged inward, that is to say formed as an indentation. During the formation of the bead, it is expedient for the latter to be able to fulfill both expansion characteristics and sealing characteristics.

The invention claimed is:

1. A heat exchanger comprising:
    a tube array, through which a first medium can flow;
    a housing, through which a second medium can flow, wherein the housing has a circumference and includes an expansion element; and
    at least one tube plate,
    wherein ends of the tube array are connected to the at least one tube plate,
    wherein the at least one tube plate is connected to the housing, and
    wherein the expansion element comprises at least two slots which run transversely with respect to a longitudinal direction of the tubes and in a circumferential direction of the housing, and
    wherein the respective of the at least two slots extend only over part of the circumference of the housing and are axially spaced from each other, and wherein the at least two slots at least partially circumferentially overlap each other.

2. The heat exchanger as claimed in claim 1, wherein a sealing element is arranged on the housing for covering and sealing the expansion element.

3. The heat exchanger as claimed in claim 2, wherein the sealing element comprises metal bellows.

4. The heat exchanger as claimed in claim 2, wherein the sealing element is formed from one of the following materials: metal, steel, elastomer, and silicone.

5. The heat exchanger as claimed in claim 2, wherein the housing is a one-piece housing.

6. The heat exchanger as claimed in claim 2, wherein the sealing element is connected to the housing by welding, soldering, clamping elements or adhesive bonds.

7. The heat exchanger as claimed in claim 1, wherein the at least two slots are a plurality of slots covering at least one region of the housing.

8. The heat exchanger as claimed in claim 7, wherein the plurality of slots is arranged in a central region of the housing as viewed in the longitudinal direction of the heat exchanger.

9. The heat exchanger as claimed in claim 7, wherein the plurality of slots is arranged in an end region or close to an end region of the housing as viewed in the longitudinal direction of the heat exchanger.

10. The heat exchanger as claimed in claim 7, wherein the plurality of slots are arranged in two groups of slots.

11. The heat exchanger as claimed in claim 10, wherein the two groups of slots are arranged in or close to two end regions of the housing.

12. The heat exchanger as claimed in claim 10, wherein each group of slots has at least two slots.

13. The heat exchanger as claimed in claim 10, wherein each group of slots has three, four, five, or six slots.

14. The heat exchanger as claimed in claim 1, wherein the at least two slots comprise four slots arranged in the housing, wherein two slots extend over less than half the circumference of the housing in one of two transverse planes forming a slotted region and a non-slotted region, wherein another two slots extended over less than half the circumference of the housing in the other of the two transverse planes forming another slotted region, and wherein the another slotted region of the other transverse plane is located opposite the non-slotted region of the transverse plane.

15. The heat exchanger as claimed in claim 1, wherein the at least two slots are spaced apart and are formed in such a way that they run beside one another in a subregion of their extent and form a narrow land between themselves.

16. The heat exchanger as claimed in claim 1, wherein the at least two slots comprise at least three slots that are spaced apart and are formed in such a way that they run beside one another in a subregion of their extent and form two narrow lands among themselves.

17. The heat exchanger as claimed in claim 1, wherein the at least two slots comprise a group of slots that form at least two lands or a plurality of lands as viewed over a circumference of the housing.

18. The heat exchanger as claimed in claim 1, wherein the at least two slots comprise a plurality of groups of slots with an arrangement of two lands per group, wherein the lands lie opposite one another as viewed in a radial direction of the housing.

19. The heat exchanger as claimed in claim 1, wherein the at least two slots comprise a plurality of groups of slots with an arrangement of two or more lands per group, wherein the lands are distributed uniformly as viewed in a circumferential direction of the housing.

20. The heat exchanger as claimed in claim 1, wherein the at least two slots comprise four slots that form four lands which partly intersect at four points of the housing.

21. The heat exchanger as claimed in claim 1, wherein the at least two slots comprise six slots, wherein the six slots form two parallel lands at four locations where some of the six slots partly intersect at four points along the housing.

22. The heat exchanger as claimed in claim 1, wherein the at least two slots have teardrop shapes at their end regions.

23. The heat exchanger as claimed in claim 1, wherein the at least two slots are introduced into the housing by means of one of the following processes: laser cutting, water jet cutting, sawing, milling, erosion and punching.

* * * * *